(12) United States Patent
Cho et al.

(10) Patent No.: US 11,897,412 B2
(45) Date of Patent: Feb. 13, 2024

(54) PASSENGER AIRBAG

(71) Applicant: HYUNDAI MOBIS CO., LTD., Seoul (KR)

(72) Inventors: Kwang Soo Cho, Yongin-si (KR); Min Su Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/068,597

(22) Filed: Dec. 20, 2022

(65) Prior Publication Data

US 2023/0382344 A1    Nov. 30, 2023

(30) Foreign Application Priority Data

May 30, 2022    (KR) .......................... 10-2022-0065940

(51) Int. Cl.
*B60R 21/2338* (2011.01)
*B60R 21/231* (2011.01)
*B60R 21/237* (2006.01)
*B60R 21/205* (2011.01)
*B60R 21/00* (2006.01)

(52) U.S. Cl.
CPC ........ *B60R 21/2338* (2013.01); *B60R 21/205* (2013.01); *B60R 21/231* (2013.01); *B60R 21/237* (2013.01); *B60R 2021/0048* (2013.01); *B60R 2021/23382* (2013.01)

(58) Field of Classification Search
CPC . B60R 21/205; B60R 21/2338; B60R 21/231; B60R 21/237; B60R 2021/23382; B60R 2021/0048; B60R 2021/0004; B60R 2021/0006; B60R 2021/0009; B60R 2021/0023
USPC ........................ 280/730.1, 732, 743.1, 743.2
See application file for complete search history.

(56) References Cited

FOREIGN PATENT DOCUMENTS

DE        102019124069 A1 *  3/2021

* cited by examiner

*Primary Examiner* — Keith J Frisby
(74) *Attorney, Agent, or Firm* — NovoTechIP International PLLC

(57) ABSTRACT

The present disclosure relates to a passenger airbag. The passenger airbag according to an embodiment of the present disclosure includes a main panel, and side panels arranged on both sides of the main panel, wherein the main panel includes a contact part to be in contact with a head of a passenger when the passenger airbag is deployed, and a folded portion partitioning the contact part such that both sides of the contact part protrude as the contact part is deployed.

19 Claims, 7 Drawing Sheets

PASSENGER AIRBAG

CROSS-REFERENCE TO RELATED APPLICATIONS

This application claims priority to and the benefit of Korean Patent Application No. 10-2022-0065940 filed on May 30, 2022, the disclosure of which is incorporated herein by reference in its entirety.

TECHNICAL FIELD

The present disclosure relates to a passenger airbag.

BACKGROUND

In general, passenger airbags for protecting passengers in the event of vehicle collision are installed on dashboards of vehicles. The passenger airbags are unfolded toward the passengers seated in passenger seats next to a driver's seat in the event of the vehicle collision.

Portions of the passenger airbags in contact with the passengers may be unfolded in a flat shape when the vehicles collide with obstacles or the passenger airbags may be unfolded to have a convex shape in a direction toward the passengers by inflators that inflate inside of the airbags.

Thus, in a situation in which the passenger airbags and the passengers face each other when the vehicles collide with obstacles, the passenger airbags may cover front portions of heads of the passengers. However, in a situation in which bodies of the passengers are shaken and thus the passenger airbags and the passengers cannot face each other when the vehicles collide with the obstacle, the passenger airbags may not completely cover the front portions of the heads of the passengers, and thus, the heads of the passengers may be injured.

To this end, in recent years, passenger airbags improved so that central portions of the airbags are formed to be concave, both sides of the airbags are formed in a symmetrical shape with respect to the concave portions, and even in a situation in which the airbags and the passengers do not face each other when the passengers come into contact with the airbags, the airbags may completely cover the front portions of the heads of the passengers.

However, a passenger airbag according to the related art has a problem in that manufacturing cost and a manufacturing time consumed for forming a central portion in a concave shape increase as compared to an initial passenger airbag.

SUMMARY

The present disclosure is directed to providing a passenger airbag improved so that manufacturing cost and manufacturing time generated to form a symmetric shape of both sides of the airbag may be reduced by forming a central portion of the airbag concave.

A passenger airbag according to an embodiment of the present disclosure includes a main panel, and side panels arranged on both sides of the main panel, wherein the main panel includes a contact part to be in contact with a head of a passenger when the passenger airbag is inflated, and a folded portion partitioning the contact part such that both sides of the contact part protrude as the contact part is toward both sides.

The contact part may have a shape inclined toward the side panels from an end of the folded portion when the passenger airbag is inflated.

The side panel may include a protrusion part having a shape corresponding to a shape of a side surface of the contact part and further protruding toward the passenger than the folded portion when the passenger airbag is inflated.

A length of the contact part may be adjusted according to adjustment of a length of the folded portion.

An overlapping area may be formed in the folded portion by a sewing operation.

The contact part may be formed in a symmetrical shape with respect to the overlapping area.

A circumference of a central portion of the main panel may be formed to be smaller than a circumference of the side panel by the folded portion.

The passenger airbag may further include a tether that is disposed inside the main panel and delays unfolding of the folded portion toward the passenger, wherein a protrusion length of the contact part is adjusted according to a length of the tether.

The main panel may include a hole disposed at a central portion of the contact part, and one side and the other side of the hole may be in contact with each other.

When the one side and the other side of the hole are in contact with each other, a circumference of a central portion of the main panel may be formed to be smaller than a circumference of a side portion of the main panel.

A passenger airbag according to an embodiment of the present disclosure includes a main panel, and side panels arranged on both sides of the main panel, wherein the main panel includes a contact part to be in contact with a head of a passenger when the passenger airbag is inflated, and a folded portion that delays unfolding of a central portion of the contact part so that a side portion of the contact part further protrudes than the central portion of the contact part when the passenger airbag is inflated.

A length of the contact part may be adjusted according to adjustment of a length of the folded portion.

An overlapping area may be formed in the folded portion by a sewing operation.

The main panel may include a hole disposed at a central portion of the contact part, and one side and the other side of the hole may be in contact with each other.

When the one side and the other side of the hole are in contact with each other, a circumference of a central portion of the main panel may be formed to be smaller than a circumference of a side portion of the main panel.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
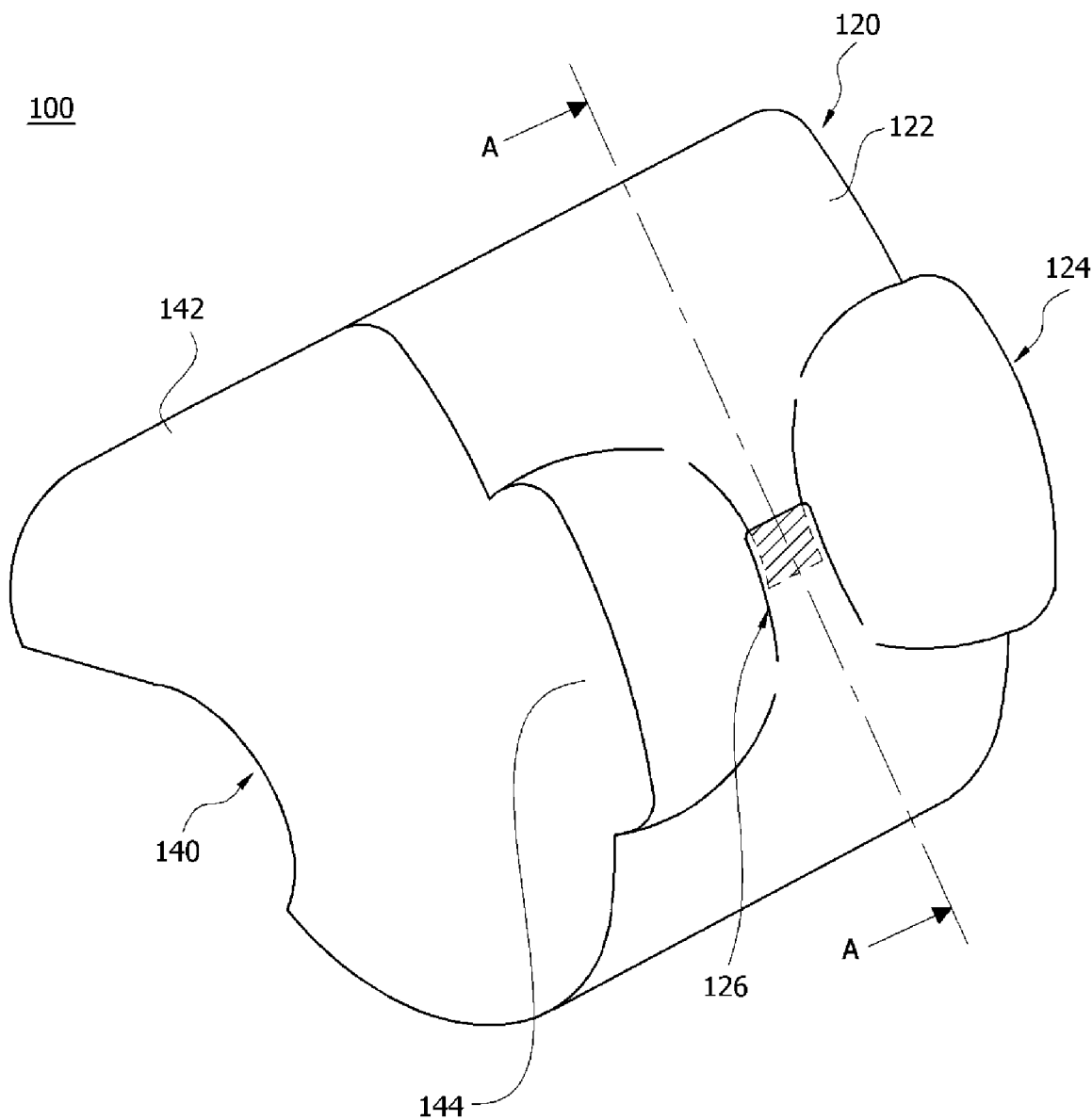
FIG. 1 is a perspective view of a passenger airbag according to an embodiment of the present disclosure.

The present disclosure may be modified in various changes and may have various embodiments and is thus intended to describe specific embodiments with the accompanying drawings. However, it should be understood that the present disclosure is not limited to the specific embodiments and includes all changes, equivalents, and substitutions included in the spirit and scope of the present disclosure.

Terms including an ordinal number such as first and second may be used to describe various components, but the components are not limited by the terms. The terms are used only for the purpose of distinguishing one component from another component. For example, without departing from the scope of the present disclosure, a second component may be referred to as a first component, and similarly, the first component may be referred to as the second component. The term "and/or" includes any or a combination of a plurality of related listed items.

It should be understood that, when it is referenced that a first component is "connected" or "coupled" to a second component, the first component may be directly connected or coupled to the second component or a third component may be present between the first component and the second component. On the other hand, it should be understood that, when a first component is "directly connected" or "directly coupled" to a second component, a third component is not present therebetween.

In the description of the embodiment, a case in which it is described that a first component is formed "on or under" a second component includes both a case in which the two components are in direct contact with each other and a case in which one or more other components are arranged between the two components. Further, when the term "on or under" is expressed, the term "on or under" may include the meanings of a downward direction as well as an upward direction based on one component.

Terms used in the present application are used only to describe the specific embodiments and are not intended to limit the present disclosure. Singular expressions include plural expressions unless clearly otherwise indicated in the context. It should be understood in the present application that terms such as "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Unless otherwise defined, all terms used herein including technical or scientific terms have the same meanings as those commonly understood by those skilled in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a passenger airbag will be described in detail with reference to the accompanying drawings, the same or corresponding components are designated by the same reference numerals regardless of the reference numerals, and the duplicated description thereof will be omitted.

Figure 2:
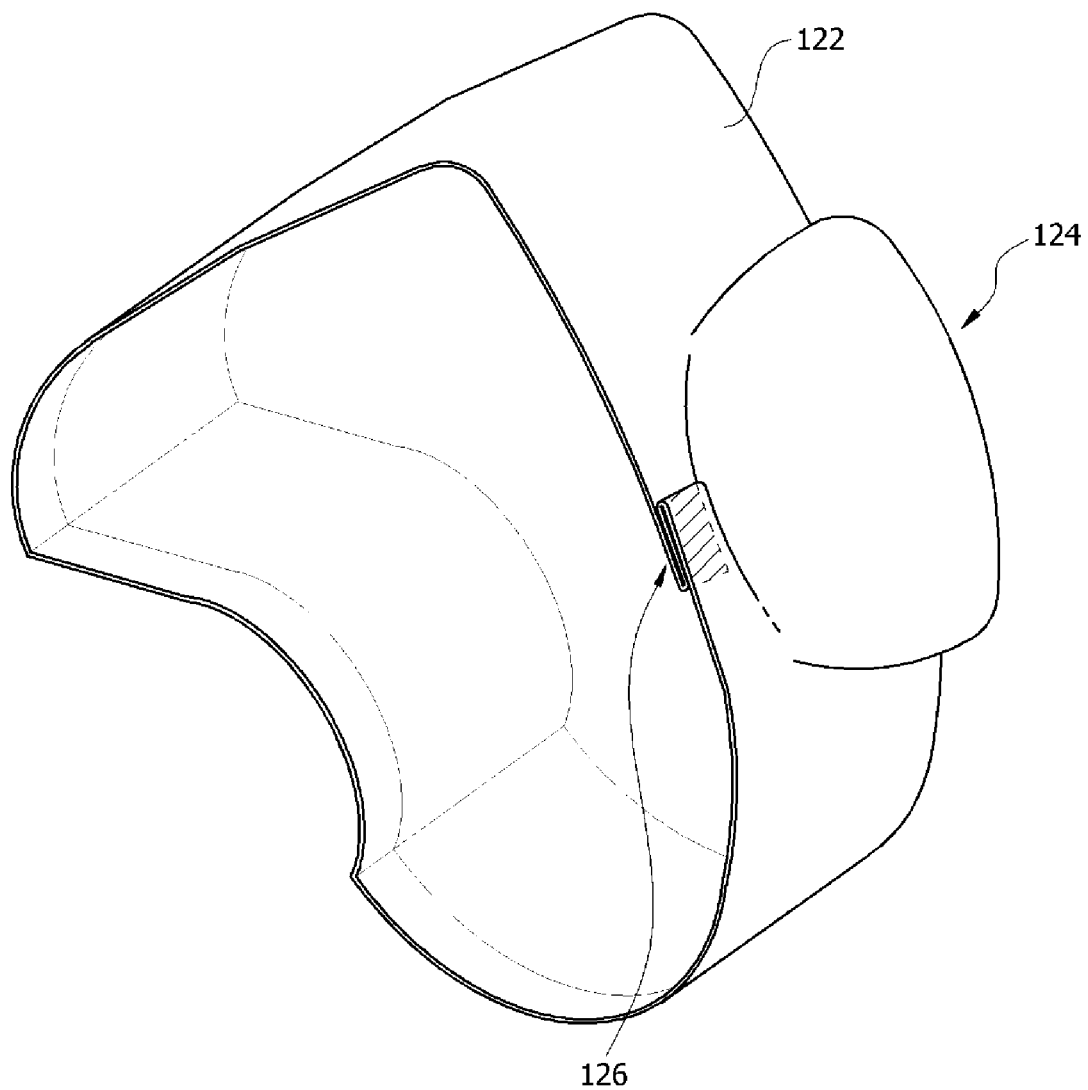
FIG. 2 is a cross-sectional view along line A-A of FIG. 1.
Figure 3:
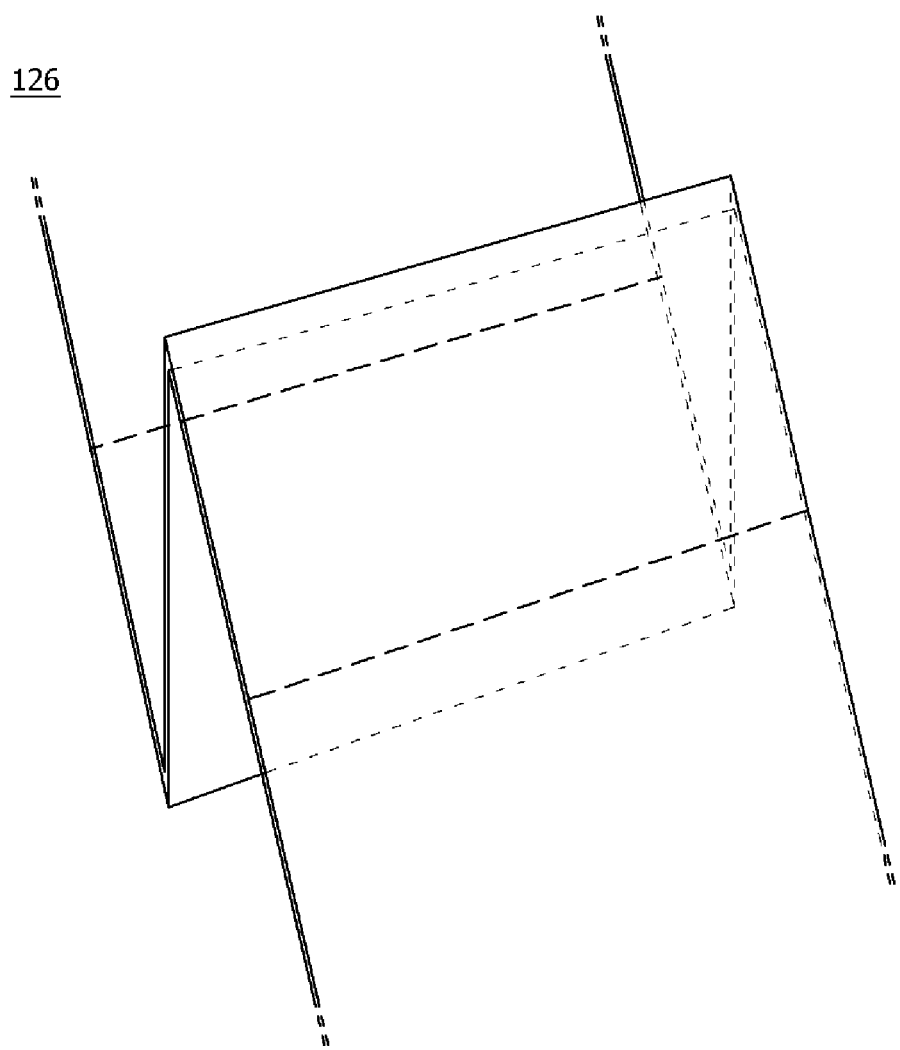
FIG. 3 is a schematic view illustrating a shape before a folding part of the passenger airbag according to the embodiment of the present disclosure is folded.
Figure 4:
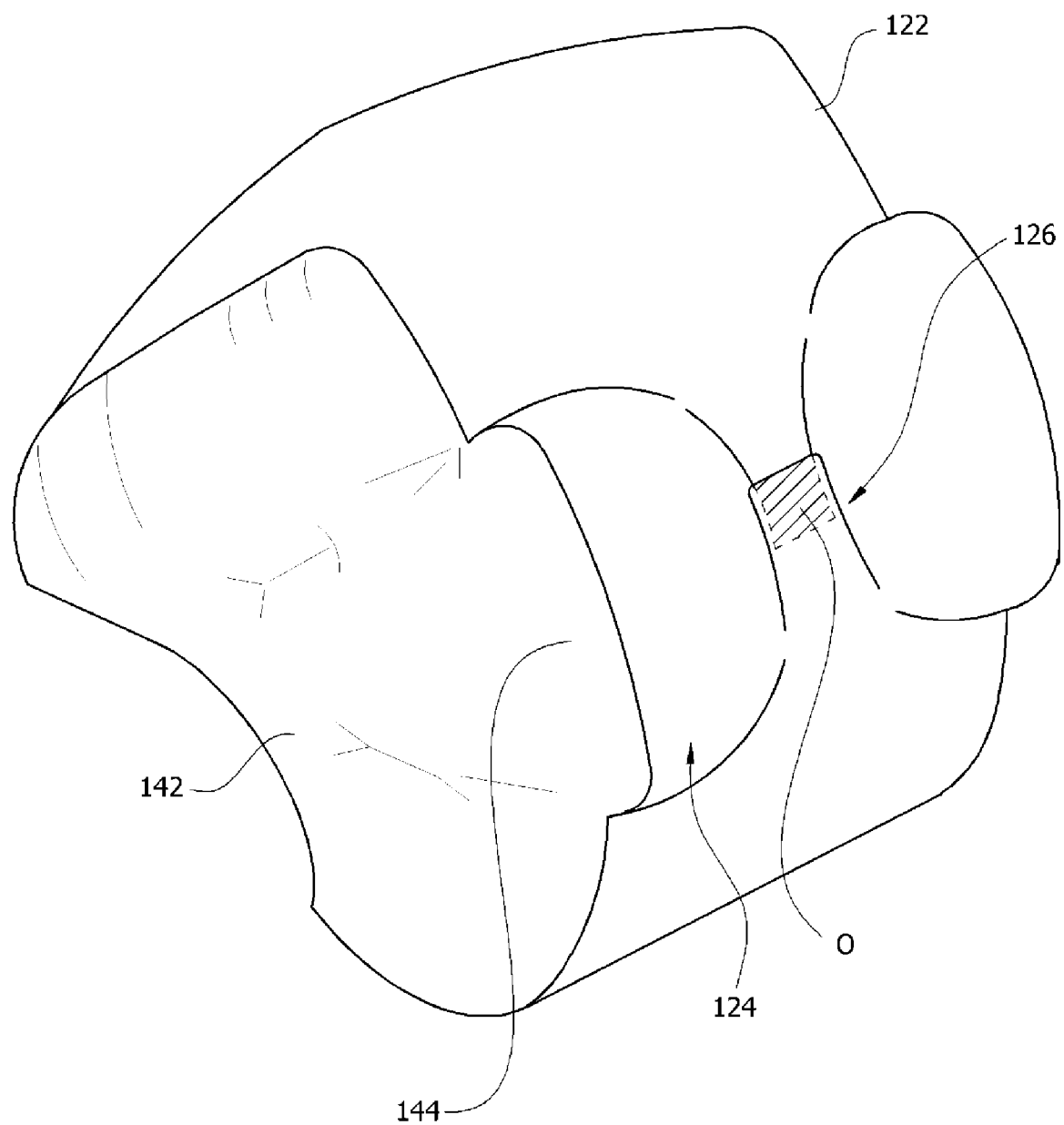
FIG. 4 is a perspective view illustrating a state in which the passenger airbag according to the embodiment of the present disclosure is inflated.

FIG. 1 is a perspective view of a passenger airbag according to an embodiment of the present disclosure, FIG. 2 is a cross-sectional view along line A-A of FIG. 1, FIG. 3 is a schematic view illustrating a shape before a folding part of the passenger airbag according to the embodiment of the present disclosure is folded, and FIG. 4 is a perspective view illustrating a state in which the passenger airbag according to the embodiment of the present disclosure is inflated.

Referring to FIGS. 1 to 4, a passenger airbag 100 according to an embodiment of the present disclosure may be disposed inside a dashboard (not illustrated) of a vehicle. Further, the passenger airbag 100 may be disposed on an inner region of the dashboard facing a passenger seat that is a seat next to a seat for a driver inside the vehicle. The passenger airbag 100 may include a main panel 120 and side panels 140 arranged on both side surfaces of the main panel 120.

The main panel 120 may be inflated by an airbag inflator (not illustrated). In more detail, the main panel 120 may protrude from the inside of the dashboard toward the passenger seat.

The main panel 120 may include a first body part 122 and a contact part 124.

The first body part 122 may accommodate air therein generated by the inflator. The first body part 122 together with the contact part 124 may constitute a closed loop shape.

The contact part 124 may be disposed on one side of the first body part 122. When the passenger airbag 100 is inflated, unfolded and deployed, the contact part 124 may protrude from the one side of the first body part 122 in a direction toward a passenger. Thus, the contact part 124 may be in contact with a front portion of the head of the passenger seated in the passenger seat when being inflated. Although the contact part 124 may have a rectangular parallelepiped shape when being inflated, the present disclosure is not limited thereto.

The side panels 140 may be coupled to the main panel 120 through a sewing operation while being arranged on both side surfaces of the main panel 120, but the present disclosure is not limited thereto. The side panels 140 may be coupled to the main panel 120 to prevent escape of the air accommodated inside the main panel 120. The side panels 140 may be inflated in a direction different from a direction in which the main panel 120 protrudes from the inside of the dashboard toward the passenger.

The side panel 140 may include a second body part 142 and a protrusion part 144.

The second body part 142 may have a shape corresponding to a shape of a side edge of the first body part 122. When the contact part 124 comes into contact with the head of the passenger, the second body part 142 may protrude in a direction different from a direction in which the main panel 120 is inflated, thereby absorbing an impact transmitted to the contact part 124.

The protrusion part 144 may have a shape protruding from a portion of the second body part 142. The protrusion part 144 may have a shape corresponding to a shape of a side surface of the contact part 124. Thus, the protrusion part 144 may cover an open end of the contact part 124.

Hereinafter, a folded portion 126 and a changed shape of the contact part 124 through the folded portion 126 will be described.

Referring back to FIGS. 1 to 4, the main panel 120 may include the folded portion 126. The folded portion 126 may be disposed at a central portion of the contact part 124. the folded portion 126 may be formed by folding the contact part 124.

As illustrated in FIG. 3, the shape of the folded portion 126 may be formed by folding the central or center portion of the contact part 124 from below to above, but the present disclosure is not limited thereto. The shape of the folded portion 126 may be formed by folding the central portion of the contact part 124 from above to below.

Further, as illustrated in FIG. 3, the folded portion 126 is folded once, but the present disclosure is not limited thereto. The folded portion 126 may have a shape that is folded two or more times.

Further, although not illustrated, one folded portion 126 is formed at the central portion of the contact part 124, but the present disclosure is not limited thereto. Two or more folded portions 126 may be formed at the central portion of the contact part 124. In this case, the plurality of folded portions 126 may be vertically arranged.

As illustrated in FIG. 3, folded portions of the folded portions 126 may be coupled to each other through a sewing operation. In this case, a horizontal length of the folded portion 126 fixed through the sewing operation may be arbitrarily changed in a manufacturing process. Thus, the horizontal length of the folded portion 126 may be determined according to a length of a sewing line formed through the sewing operation.

Further, a vertical length of the folded portion 126 may be determined through the sewing operation. The vertical length of the folded portion 126 fixed through the sewing operation may be arbitrarily changed in the manufacturing process. Thus, the vertical length of the folded portion 126 may be determined according to the length of the sewing line formed through the sewing operation.

The length of the contact part 124 may be determined by the length of the folded portion 126. Thus, when the passenger airbag 100 is inflated, the contact part 124 may stably surround the front portion of the head of the passenger regardless of different head sizes of passengers.

The folded portion 126 may partition the contact part 124 such that the contact part 124 protrudes toward both sides in a state in which the folded portion 126 is disposed at the central portion of the contact part 124. Further, when the passenger airbag 100 is inflated, the contact part 124 may have a shape inclined toward the side panel 140 from an end of the folded portion 126. Thus, when the passenger airbag 100 is inflated, the contact part 124 may have a protruding shape as compared to the folded portion 126, and an accommodation space in which the front portion of the head of the passenger may be accommodated is formed between the contact part 124 and the folded portion 126.

Thus, when the passenger comes into contact with the passenger airbag 100, the front portion of the head of the passenger may come into contact with the contact part 124 and the folded portion 126 forming a concave shape while entering the accommodation space. Accordingly, when the passenger and the passenger airbag 100 do not face each other, even when the passenger comes into contact with the passenger airbag 100, the contact part 124 and the folded portion 126 may stably cover the front portion of the head of the passenger.

Since the folded portion 126 is disposed at the central portion of the main panel 120, a circumference of the central portion of the main panel 120 may be smaller than a circumference of the side panel 140. In more detail, since the central portion of the contact part 124 is folded by the folded portion 126, one side (for example, an upper side) and the other side (for example, a lower side) of the central portion of the main panel 120 may be pulled toward the folded portion 126. Accordingly, the circumference of the central portion of the main panel 120 becomes smaller than before the folded portion 126 is formed, and the circumference of the central portion of the main panel 120 may be smaller than a circumference of a side portion of the main panel 120 and a circumference of the side panel 140. Thus, when the passenger airbag 100 is inflated, the contact part 124 may further protrude toward the passenger as compared with the folded portion 126.

Further, since the circumference of the central portion of the main panel 120 is formed to be smaller than the circumference of the side panel 140 due to the folded portion 126, the protrusion part 144 of the side panel 140 may further protrude toward the passenger as compared to the folded portion 126 when the passenger airbag 100 is inflated. Thus, one end of the contact part 124 coupled to the protrusion part 144 of the side panel 140 may have a protruding shape further than the other end of the contact part 124 connected to the folded portion 126.

Referring back to FIGS. 1 to 4, an overlapping area O may be formed in the folded portion 126 through a sewing operation. In more detail, the overlapping area O may be formed inside the sewing line formed by the sewing operation in the folded portion 126.

As illustrated in FIG. 3, since the overlapping area O has three layers of the first body part 122, the rigidity of the overlapping area O may be increased as compared to the contact part 124. Thus, when the passenger airbag 100 is inflated by the inflator, the folded portion 126 may protrude less toward the passenger as compared to the contact part 124. This may mean that, when the passenger airbag 100 is inflated, the overlapping area O delays unfolding of the central portion of the contact part 124 so that a side portion of the contact part 124 further protrudes as compared to the central portion of the contact part 124 in which the folded portion 126 is disposed.

By delaying the unfolding of the central portion of the contact part 124 by the overlapping area O, the central portion of the contact part 124 may be formed concavely. Thus, even in a situation in which the passenger airbag 100 and the passenger do not face each other, the contact part 124 may completely cover the front portion of the head of the passenger, and thus injury of the head of the passenger may be reduced.

Further, both sides of the contact part 124 may be formed to be symmetrical to each other with respect to the overlapping area O due to the overlapping area O formed in the folded portion 126. Since a portion between both sides of the contact part 124 is concavely formed by the folded portion 126, even in a situation in which both sides of the contact part 124 having a symmetrical shape and the passenger do not face each other, the contact part 124 may stably cover the front portion of the head of the passenger.

Hereinafter, a passenger airbag 200 according to another embodiment of the present disclosure will be described. In the passenger airbag 200 according to another embodiment of the present disclosure, the same configuration as the passenger airbag 100 according to the embodiment of the present disclosure uses the same reference numerals, and a description thereof will be omitted.

Figure 5:
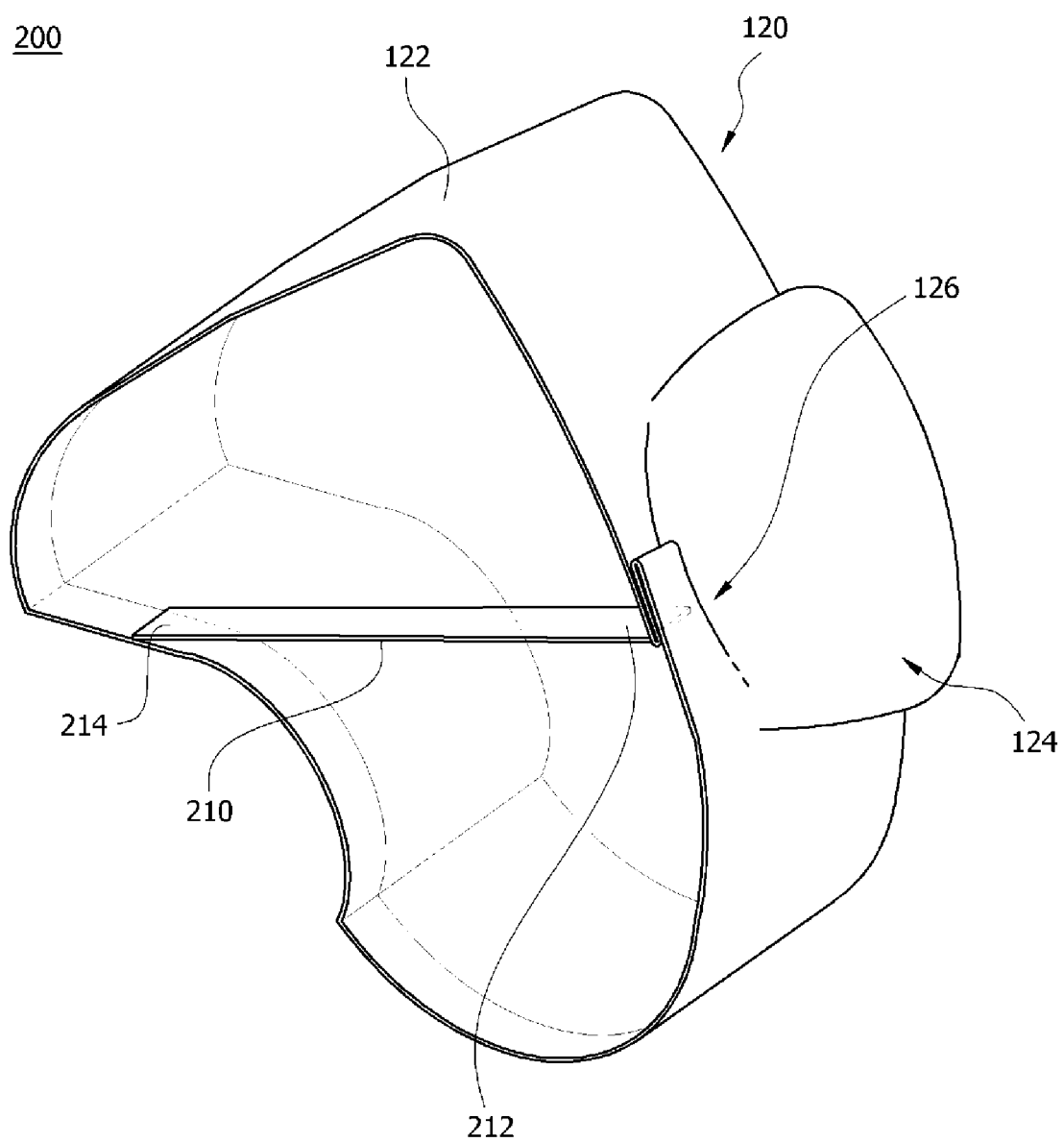
FIG. 5 is a view illustrating a cross section of the passenger airbag according to another embodiment of the present disclosure.

FIG. 5 is a view illustrating a cross section of the passenger airbag according to another embodiment of the present disclosure.

Referring to FIG. 5, the passenger airbag 200 according to another embodiment of the present disclosure may include a tether 210.

The tether 210 may be disposed inside the main panel 120. The tether 210 may be provided in a rectangular shape, but the present disclosure is not limited thereto.

The tether 210 may be disposed at two points inside the main panel 120 in a state of being disposed inside the main panel 120. One end 212 of the tether 210 may be in contact with the overlapping area O of the folded portion 126, and the other end 214 thereof may be in contact with a portion of the first body part 122.

The tether 210 is in contact with the overlapping area O of the folded portion 126 in a state of being disposed inside the main panel 120, and thus when the passenger airbag 100 is inflated, the central portion of the contact part 124 in which the folded portion 126 is disposed may protrude less as compared to both sides of the contact part 124. This may mean that the unfolding of the central portion of the contact part 124 in which the folded portion 126 is disposed in a direction toward the passenger as compared to both sides of the contact part 124 is delayed. Thus, the head of the passenger can be stably supported by the concave central portion of the contact part 124.

Although not illustrated, a distance between the central portion of the contact part 124 in which the folded portion 126 is disposed and both sides of the contact part 124 may be determined based on a length of the tether 210. Thus, the passenger airbag 100 may have a shape that can stably cover the head of the passenger by the tether 10 regardless of different head sizes of passengers.

Hereinafter, a passenger airbag 300 according to still another embodiment of the present disclosure will be described. In the passenger airbag 300 according to still another embodiment of the present disclosure, the same configuration as the passenger airbag 100 according to the embodiment of the present disclosure uses the same reference numerals, and a description thereof will be omitted.

Figure 6:
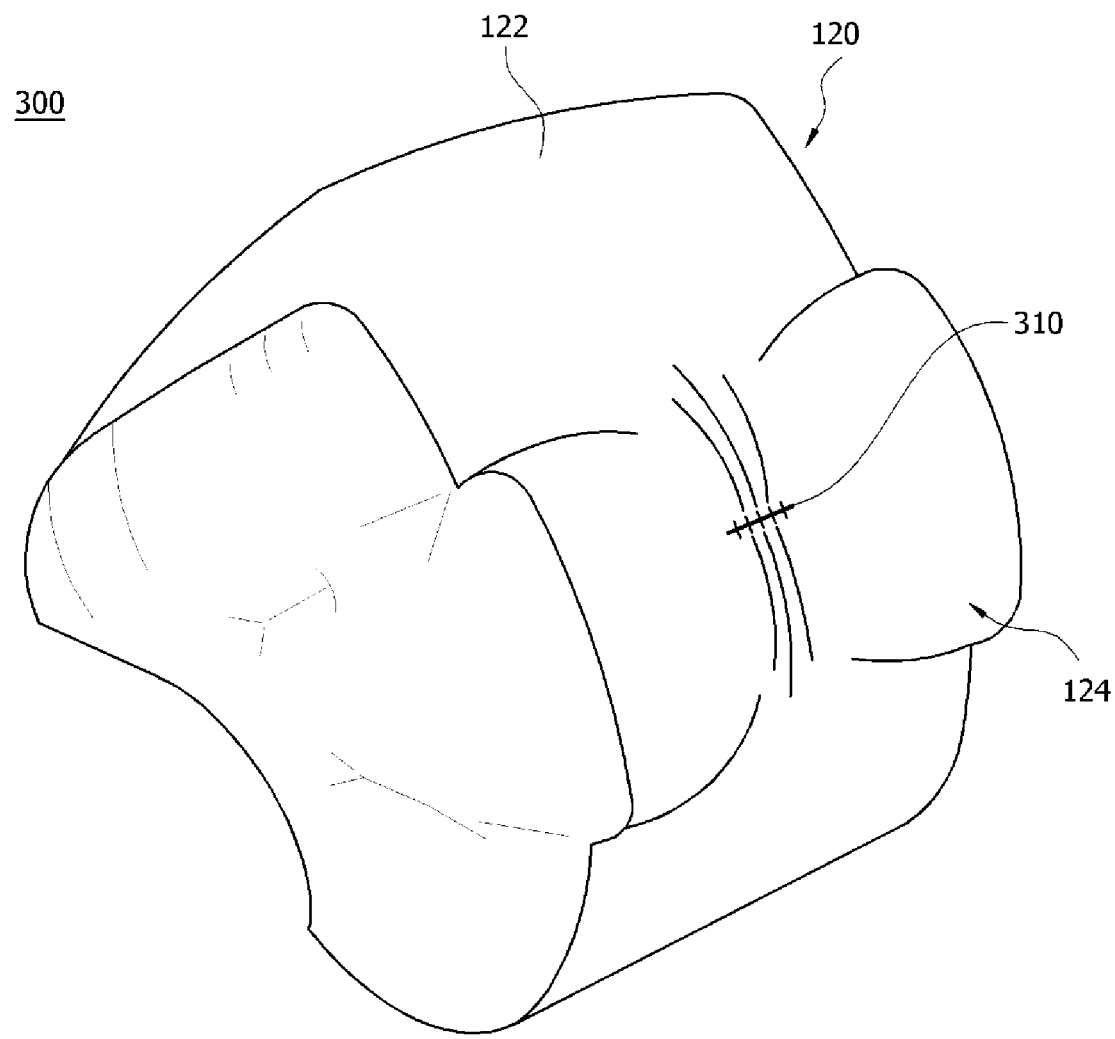
FIG. 6 is a perspective view illustrating a state in which a passenger airbag according to still another embodiment of the present disclosure is inflated.
Figure 7:
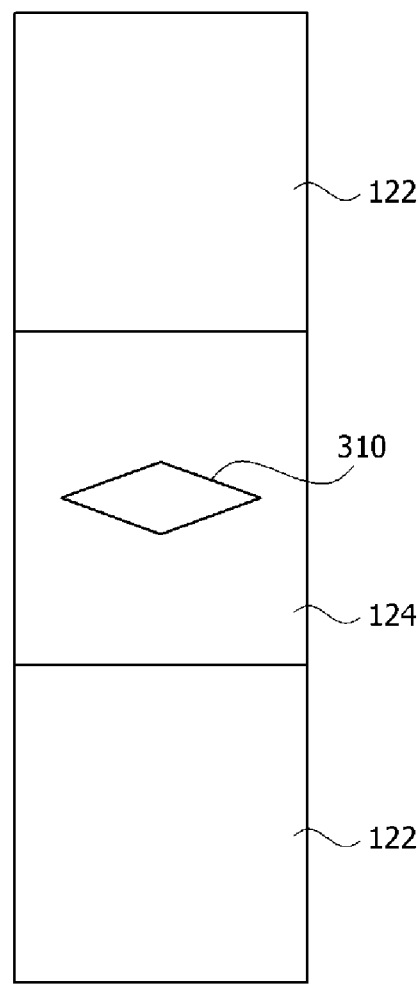
FIG. 7 is an exploded view of a main panel of the passenger airbag according to still another embodiment of the present disclosure.

FIG. 6 is a perspective view illustrating a state in which a passenger airbag according to still another embodiment of the present disclosure is inflated, and FIG. 7 is an exploded view of a main panel of the passenger airbag according to still another embodiment of the present disclosure.

Referring to FIGS. 6 and 7, the passenger airbag 300 according to still another embodiment of the present disclosure may include a hole 310.

The hole 310 may be disposed in the main panel 120. In more detail, the hole 310 may be disposed at the central portion of the contact part 124. The hole 310 may have a diamond shape.

One side and the other side of the hole 310 may be in contact with each other. In a state in which the one side and the other side are in contact with each other, a folded state of the hole 310 can be maintained through a sewing operation. When the one side and the other side of the hole 310 are in contact with each other, the one side (for example, an upper side) and the other side (for example, a lower side) of the first body part 122 may be pulled in a direction toward the hole 310 with respect to the hole 310. Accordingly, the circumference of the central portion of the main panel 120 may be formed to be smaller than the circumference of the side portion of the main panel 120, and when the passenger airbag 100 is inflated, the central portion of the contact part 124 may protrude less as compared to both sides of the contact part 124. Thus, the front portion of the head of the passenger can be stably covered by the concave central portion of the contact part 124 being formed concavely.

In the present embodiment, the hole 310 has a diamond shape, but the present disclosure is not limited thereto. The hole 310 may have any shape as long as the one side and the other side of the hole 310 are in contact with each other.

According to an embodiment of the present disclosure, manufacturing cost and manufacturing time for manufacturing an airbag may be reduced, and thus productivity can be improved.

Although the embodiments of the present disclosure have been described above, those skilled in the art may understand that the present disclosure may be variously modified and changed without departing from the spirit and scope of the present disclosure described in the appended claims. Further, differences related to these changes and modifications should be construed as being included in the scope of the present disclosure defined in the appended claims.

The invention claimed is:

1. A passenger airbag comprising:
 a main panel including a contact part configured to be in contact with a passenger's head when the passenger airbag is deployed; and
 a pair of side panels respectively arranged on both sides of the main panel,
 wherein the main panel has a folded portion disposed at a center portion of the contact part to lower the center portion of the contact part such that opposite side portions of the contact part protrude farther toward the passenger than the folded portion protrudes when the passenger airbag is deployed, and
 wherein the folded portion of the contact part is located between the opposite side portions of the contact part such that one edge of the folded portion is adjacent to a first one of the opposite side portions and an opposite edge of the folded portion is adjacent to a second one of the opposite side portions.

2. The passenger airbag of claim 1, wherein the contact part is inclined toward the side panels from the folded portion when the passenger airbag is deployed.

3. The passenger airbag of claim 2, wherein the side panel includes a protrusion part having a shape corresponding to a shape of a side surface of the contact part and protruding toward the passenger farther than the folded portion when the passenger airbag is deployed.

4. The passenger airbag of claim 2, wherein a length of the contact part is based on a folding length of the folded portion.

5. The passenger airbag of claim 4, wherein the folded portion has an overlapping area at which two adjoining portions of the main panel overlap each other.

6. The passenger airbag of claim 5, wherein the contact part has a symmetrical shape with respect to the overlapping area.

7. The passenger airbag of claim 5, wherein the folded portion reduces a circumference of the center portion of the main panel so as to be smaller than that of the side panel.

8. The passenger airbag of claim 1, further comprising a tether disposed within the main panel and configured to delay unfolding of the folded portion, wherein a protrusion length of the contact part is based on a length of the tether.

9. The passenger airbag of claim 1, wherein:
 the main panel has a hole disposed at the center portion of the contact part, and the main panel has first and second portions respectively adjoining mutually opposed sides of the hole and in contact with each other.

10. The passenger airbag of claim 9, wherein the contact between the first and second portions of the main panel at the center portion of the contact part reduces a circumference of a center portion of the main panel so as to be smaller than that of a side portion of the main panel.

11. The passenger airbag of claim 1, wherein:
the folded portion of the contact part is located between the opposite side portions of the contact part in a horizontal direction of the passenger airbag, and
the folded portion is comprised of a first portion and a second portion, wherein the second portion is folded over the first portion in a vertical direction of the passenger airbag.

12. The passenger airbag of claim 1, wherein the one edge of the folded portion is in contact with the first one of the opposite side portions and the opposite edge of the folded portion is in contact with the second one of the opposite side portions.

13. A passenger airbag comprising:
a main panel; and
a pair of side panels respectively arranged on opposite sides of the main panel,
wherein the main panel includes:
a contact part configured to be in contact with a passenger's head when the passenger airbag is deployed; and
a folded portion configured to delay unfolding of a center portion of the contact part so that first and second side portions of the contact part protrude farther than the center portion of the contact part when the passenger airbag is deployed
wherein the folded portion is located between the first and second side portions of the contact part such that one edge of the folded portion is adjacent to the first side portion and an opposite edge of the folded portion is adjacent to the second side portion.

14. The passenger airbag of claim 13, wherein a length of the contact part is based on a folding length of the folded portion.

15. The passenger airbag of claim 14, wherein the folded portion has an overlapping area at which two adjoining portions of the main panel overlap each other.

16. The passenger airbag of claim 13, wherein the main panel has:
a hole disposed at the center portion of the contact part; and
first and second portions respectively adjoining mutually opposed sides of the hole and in contact with each other.

17. The passenger airbag of claim 16, wherein the contact between the first and second portions of the main panel reduces a circumference of the center portion of the main panel so as to be smaller than that of a side portion of the main panel.

18. The passenger airbag of claim 13, wherein:
the folded portion of the contact part is located between the first and second side portions of the contact part in a horizontal direction of the passenger airbag, and
the folded portion is comprised of a first portion and a second portion, wherein the second portion is folded over the first portion in a vertical direction of the passenger airbag.

19. The passenger airbag of claim 13, wherein the one edge of the folded portion is in contact with the first side portion and the opposite edge of the folded portion is in contact with the second side portion.

* * * * *